(No Model.)
S. MOULSONG.
BAIT CAGE.
No. 455,758. Patented July 14, 1891.
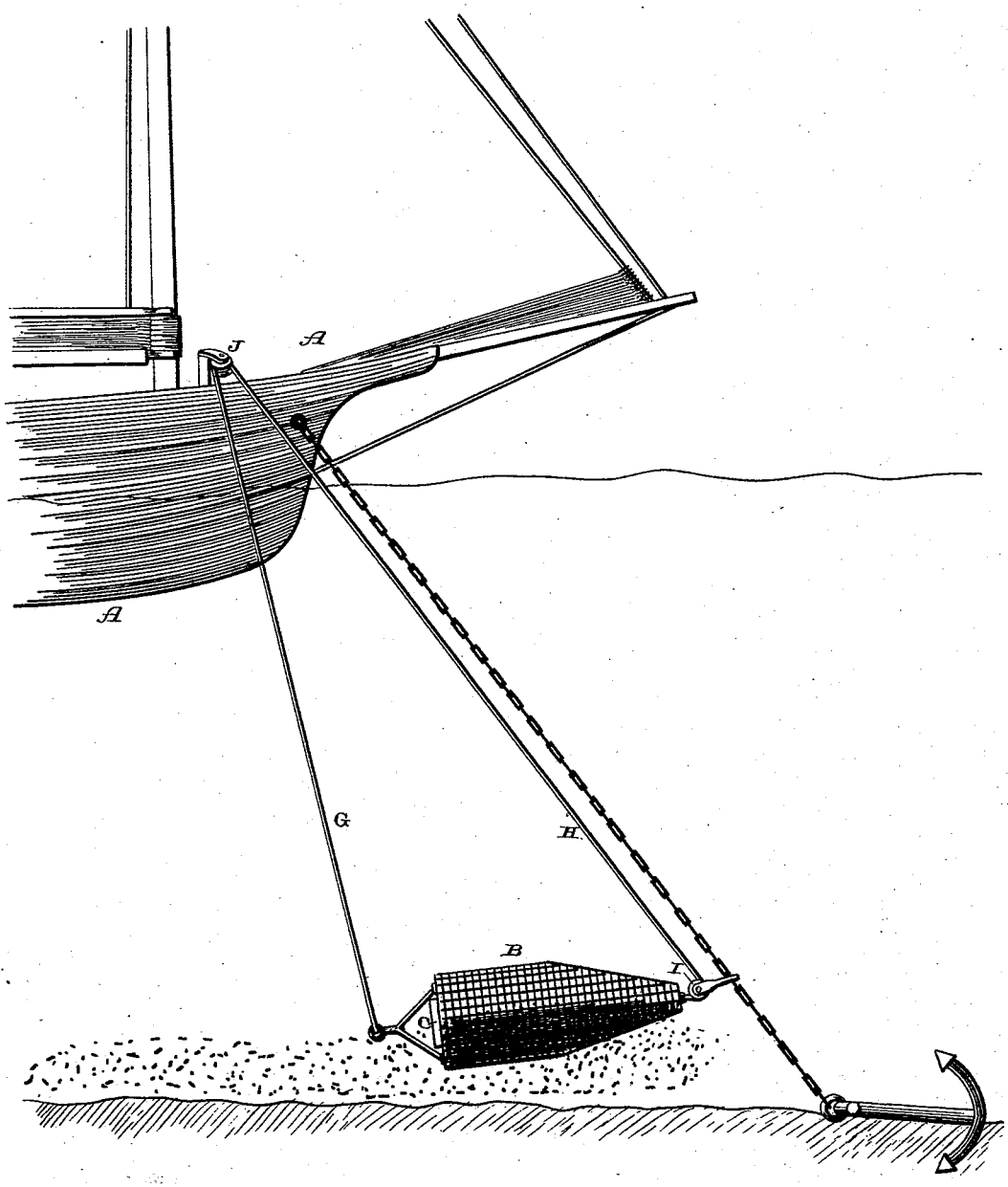
Witnesses:
E. P. Ellis,
B. Brockett,
Inventor:
S. Moulsong,
per Lehmann & Hattison,
Att'ys

UNITED STATES PATENT OFFICE.

SILVINE MOULSONG, OF GLOUCESTER, MASSACHUSETTS.

BAIT-CAGE.

SPECIFICATION forming part of Letters Patent No. 455,758, dated July 14, 1891.

Application filed June 30, 1890. Serial No. 357,243. (No model.)

*To all whom it may concern:*

Be it known that I, SILVINE MOULSONG, of Gloucester, in the county of Essex and State of Massachusetts, have invented certain new and useful Improvements in Bait-Cages; and I do hereby declare the following to be a full, clear, and exact description of the invention, such as will enable others skilled in the art to which it pertains to make and use it, reference being had to the accompanying drawing, which forms part of this specification.

My invention relates to an improvement in bait-cages; and it consists in the combination and arrangement of parts, which will be fully described hereinafter.

The object of my invention is to provide a cage for holding bait and which is to be raised and lowered from the anchor chain or cable, and by means of which the bait which is to be fed to the fish can be kept around the vessel and prevented from being carried away by the movement of the water.

The accompanying drawing represents a side elevation of a device which represents my invention.

A represents the outline of a fishing-vessel lying at anchor. In order to bring the fish around the vessel it is customary for the sailors to throw bait overboard. A great portion of this bait is carried away by the currents of the ocean a considerable distance from the vessel, and hence the bait is practically thrown away. In order to prevent this, I take a cage B, made either of wire or any other suitable material, and which has meshes sufficiently large to allow the bait to work through and place the bait inside of the cage through a door C, which is formed through one end. To one end of this cage is attached by means of a suitable swivel a rope or chain G, and to the opposite end of the cage is attached a rope or chain H, which passes around the guiding-pulley I, which is fastened either to the anchor or its cable at any suitable point. The upper ends of the two lines or chains for raising and lowering the cage are connected and passed over a pulley or other suitable guide J on the vessel, and then by pulling on one line the cage can be raised and by pulling on the other the cage can be lowered to near the bottom of the ocean. If not desired to connect the cage to the regular anchor, another anchor may be used for this special purpose and dropped from any part of the vessel. By the use of the swivel the cage can turn with the current without fouling the raising and lowering lines.

Having thus described my invention, I claim—

1. The combination, with a vessel and an anchor, of a guide connected with the anchor, a bait-trap, and a rope connected to the vessel and which passes through the guide and is attached to the trap for lowering it, and a rope connected with the trap and the vessel for raising it, substantially as described.

2. The combination, with an anchor or anchor-chain, of a guiding-loop connected thereto, a bait-trap, and a rope having one end passed through the guide and connected to one end of the trap, its opposite end connected with the opposite end of the trap, an object above the water, and a guide attached thereto, around which the rope passes, whereby the trap can be raised and lowered at will, substantially as shown and described.

In testimony whereof I affix my signature in presence of two witnesses.

SILVINE $\overset{\text{his}}{\times}$ MOULSONG.
<br>             mark

Witnesses:
 FRANK E. SMOTHERN,
 FRANK ROBINSON.